(12) United States Patent
Carnegie et al.

(10) Patent No.: US 6,196,047 B1
(45) Date of Patent: Mar. 6, 2001

(54) METHOD AND SYSTEM TO MEASURE TORQUE PER UNIT CURRENT AS A FUNCTION OF ANGLE IN HARD DISK DRIVE ACTUATORS

(75) Inventors: David W. Carnegie; James H. Wise, both of Valparaiso, IN (US)

(73) Assignee: Ugimag, Inc., Valparaiso, IN (US)

( * ) Notice: Subject to any disclaimer, the term of this patent is extended or adjusted under 35 U.S.C. 154(b) by 0 days.

(21) Appl. No.: 08/928,110

(22) Filed: Sep. 22, 1997

(51) Int. Cl.[7] .................................................. G01L 1/00
(52) U.S. Cl. ...................................... 73/1.11; 73/862.541
(58) Field of Search .......................... 360/78.04–78.8; 73/862.541, 1.11

(56) References Cited

U.S. PATENT DOCUMENTS

| | | | |
|---|---|---|---|
| 4,308,753 | * 1/1982 | Olson | 73/861.17 |
| 5,005,089 | * 4/1991 | Thanos et al. | 360/77.08 |
| 5,305,160 | * 4/1994 | Funches et al. | 360/780.07 |
| 5,476,015 | * 12/1995 | Valent | 73/862.541 |
| 5,616,896 | * 4/1997 | Valent | 73/862.541 |
| 5,847,895 | * 12/1998 | Romano et al. | 360/78.09 |

OTHER PUBLICATIONS

Stratton, Julius Adams, "Electromagnetic Theory", McGraw–Hill Book Company, Inc., New York, 1941, Section 2.14, pp. 118–119.

Jackson, J. D., Classical Electrodynamics, John Wiley & Sons, New York, 1975, Chapters 5–6, pp. 168–268.

* cited by examiner

Primary Examiner—Benjamin R. Fuller
Assistant Examiner—Jewel V. Thompson
(74) Attorney, Agent, or Firm—Oblon, Spivak, McClelland, Maier & Neustadt, P.C.

(57) ABSTRACT

A method and apparatus for calculating a torque constant, $K_t$, of an actuator for a computer disk drive by passing the actuator through a magnetic field and measuring the induced change in potential. A stepper motor moves the coil through a magnetic field (either by rotation or linear movement), and a fluxmeter measures changes in flux. The measurements are synchronized using an encoder which commands a digital multimeter to sample the fluxmeter. By passing the actuator in both a forward and a reverse direction, the contribution based on voltage integrator drift is reduced. This method and system are not influenced by the torque from mechanical effects such as friction or torque from the current carrying leads.

20 Claims, 12 Drawing Sheets

METHOD AND SYSTEM TO MEASURE TORQUE PER UNIT CURRENT AS A FUNCTION OF ANGLE IN HARD DISK DRIVE ACTUATORS

BACKGROUND OF THE INVENTION

1. Field of the Invention

A method and apparatus for analyzing magnets and/or actuator coils in magnetic head assemblies for magnetic disk drives, and specifically a method and apparatus for measuring the torque per unit current generated by magnets as a function of position or angle in actuator coils in hard disk drives.

2. Discussion of the Background

Hard disk drives contain disk media (i.e., platters on which data is written and from which the data is read), actuators which move the head over the spinning disk media, and drive electronics which control the positioning of the actuator over the disk media. Radial actuators use a pivot to swing the head in an arcing path, and linear actuators move the head in a linear path. UGIMAG, Inc, the assignee of the present application, manufactures permanent magnets and magnet assemblies for use in actuators. As shown partially in FIGS. 1A and 1B, in a voice coil motor (VCM) type electromagnetic rotary actuator, the actuator includes at least one permanent magnet 84, having north and south polarizations, and an actuator coil 50 with a number, N, of windings, which generates a magnetic field when current is applied to the windings. Often the permanent magnet 84 is mounted on a metal mounting plate 82 to form a plate assembly 80B. The plate 82 is typically made of steel or another highly magnetizable material. The actuator may also contain a second plate assembly 80A on the opposite side of the actuator coil 50 as compared to the plate assembly 80B. In FIG. 1B, the plate assembly 80A is not illustrated to provide a clearer view of the actuator coil 50 with reference to the polarity of the magnet 84. Based on the magnitude and direction of the current in the actuator coil 50, the actuator coil 50 is biased toward one side or the other of the permanent magnet, producing a torque on the actuator arm. The torque or force is produced by the interaction of the current in the coil with the magnet 84 of the plate assemblies 80A and 80B. This is known as the Lorentz force.

In rotary actuators, since the actuator coil 50 is mounted on an actuator arm near the arm's pivot point, the opposite end of the actuator arm that supports the disk drive's read-write head is moved in the opposite direction over the disk media. The current is supplied by a servo-control system in response to commands from a computer control system. The torque is applied to the assembly to move the heads from track to track over the recording surface. Currents are supplied that accelerate and decelerate the angular motion in order to achieve the desired motion.

One of the design parameters of an actuator system is the torque produced on the actuator arm per unit current. For proper control of the position, this torque per unit current, often called the torque constant $K_t$, should be nearly constant over the usable angular range of the actuator. For rapid repositioning of the read-write heads, the torque constant should be high enough so that the necessary torque can be applied with currents available from the servo-controller. In a practical actuator, the torque constant $K_t$ is not constant. Often $K_t$ is maximum near the center of the angular range and decreases as the arm approaches either limit. Designers specify the properties of the function $K_t(\theta)$ where $\theta$ is the angular position of the actuator arm referenced to a suitable origin.

A variety of methods have been used to test manufactured magnet assemblies for quality control purposes. Most of the methods use very simple Hall probe measurements of the induction in the gap of the magnet assembly at a few selected locations. Sometimes, additional locations are tested to indicate possible errors in the position of the magnets or in the location of the transition zone of bi-polarized magnets. Static flux measurements have also been used to measure the induction in the gap of the magnet assembly.

These known techniques compare measurements to the theoretically determined induction at selected points or areas when using flux measurements, but the techniques do not correlate to the properties of the function $K_t(\theta)$. There have been several attempts to measure torque directly with a torque transducer or indirectly by measuring the force on a transducer at a certain position on the actuator arm when a known current is applied to the coil. While these systems work, they require complex alignment, almost continuous calibration, and do not isolate the magnetic contribution to the torque from mechanical effects such as friction or torque from the current carrying leads. The most complex systems use two force transducers and can measure the torque at only three angles in about one minute.

One known system measures $K_t(\theta)$ indirectly by analyzing the signals in the disk drive servo controller. The actuator assembly is mounted in the disk drive housing which is mounted on a rotary stage. This allows the measurements to be carried out as a function of angle. Calibration is done by comparing the measurement at one angle to the torque produced by a standard mass. The test takes about forty-five minutes. The initial alignment of the disk drive housing and actuator requires about fifteen minutes. The system further requires an expensive signal analyzer. This system also requires a complex interface to the disk drive servo electronics and is very slow.

A second torque measurement system is available from Vibrac Corporation of Amherst, N.H. The system measures torque from an applied current as a function of angle by using a torque transducer. A measurement over an actuator's range of motion takes up to thirty minutes. A third torque measurement system, the M-15 Universal Torque Tester, is available from Measurement Research, Inc. (MRI) of San Fernando, Calif. This system automatically measures torque in the clockwise and counterclockwise directions due to an applied current derived from force measurements. To measure over the entire range takes about two minutes.

In the second and third systems, contributions from friction and forces on current terminals are indistinguishable from the magnetic component in the torque data, and these systems are difficult to set up and operate. Calibration is difficult, with the results being operator-dependent and incompatible with standards from the National Institute for Standards and Technology (NIST). Further, because of the testing time required for these systems, these systems are inappropriate for even medium to large scale production volumes.

SUMMARY OF THE INVENTION

It is an object of the present invention to address at least one disadvantage of known torque measurement systems for actuators of hard disk drives.

It is an object of the present invention to provide a more accurate, reliable and faster measurement system with NIST traceability.

These and other objects of the invention are addressed by a method and system for measuring the torque per unit current as a function of angle or as a function of position for actuators for hard disk drives by using purely magnetic measurements. For radial actuators, the actuator coil is attached to a stepper motor which swings the actuator coil forward and backward through a magnetic field in order to measure changes in magnetic flux throughout the range of motion. For linear actuators, a motorized linear stage drives the actuator coil forward and backward through a magnetic field. Changes in flux are measured by a flux meter through a digital multimeter. This technique is independent of any constant offset in the fluxmeter. Also, by using data from both forward and reverse measurements, errors from drift are reduced. This technique is suitable for either testing coils with known magnets or for testing magnets with known coils.

BRIEF DESCRIPTION OF THE DRAWINGS

A more complete appreciation of the invention and many of the attendant advantages thereof will become readily apparent to those skilled in the art with reference to the following detailed description, particularly when considered in conjunction with the accompanying drawings, in which.

DESCRIPTION OF THE PREFERRED EMBODIMENTS

Figure 1A:
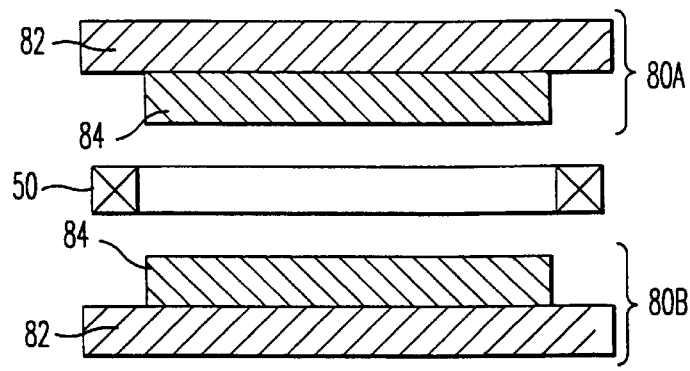
FIG. 1A is cross-section illustration of an electromagnetic actuator including top and bottom plate assemblies and an actuator coil.
Figure 1B:
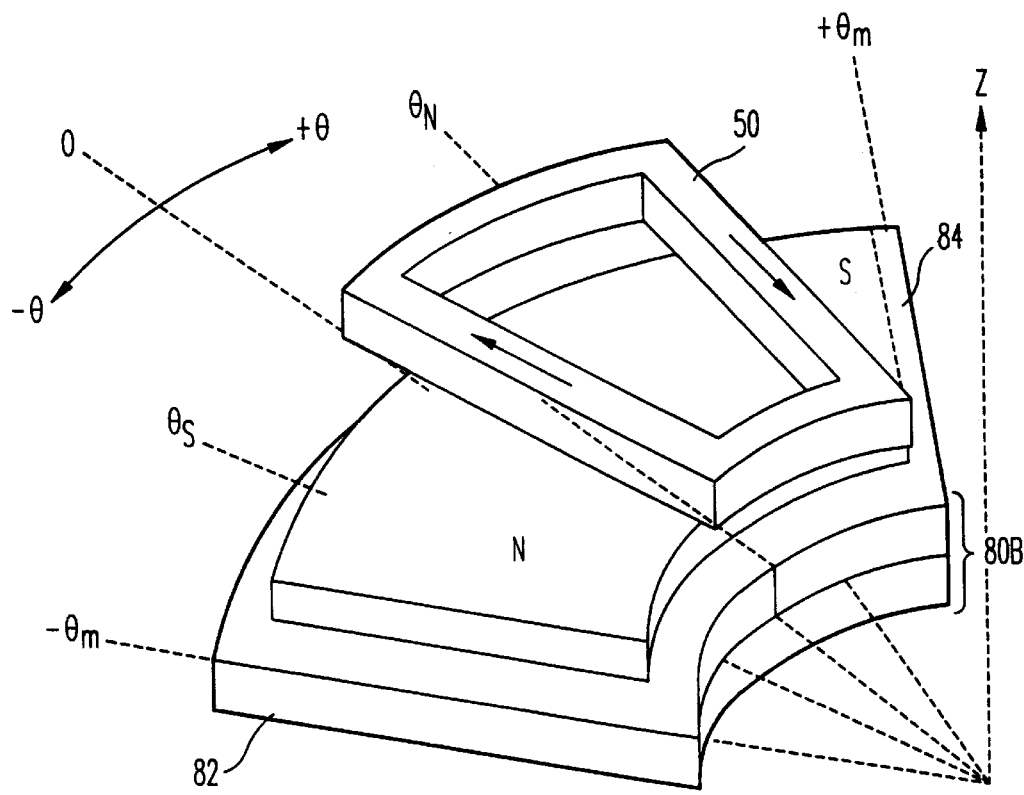
FIG. 1B is an illustration of the electromagnetic actuator of FIG. 1A with the top plate assembly removed for simplicity.
Figure 2:
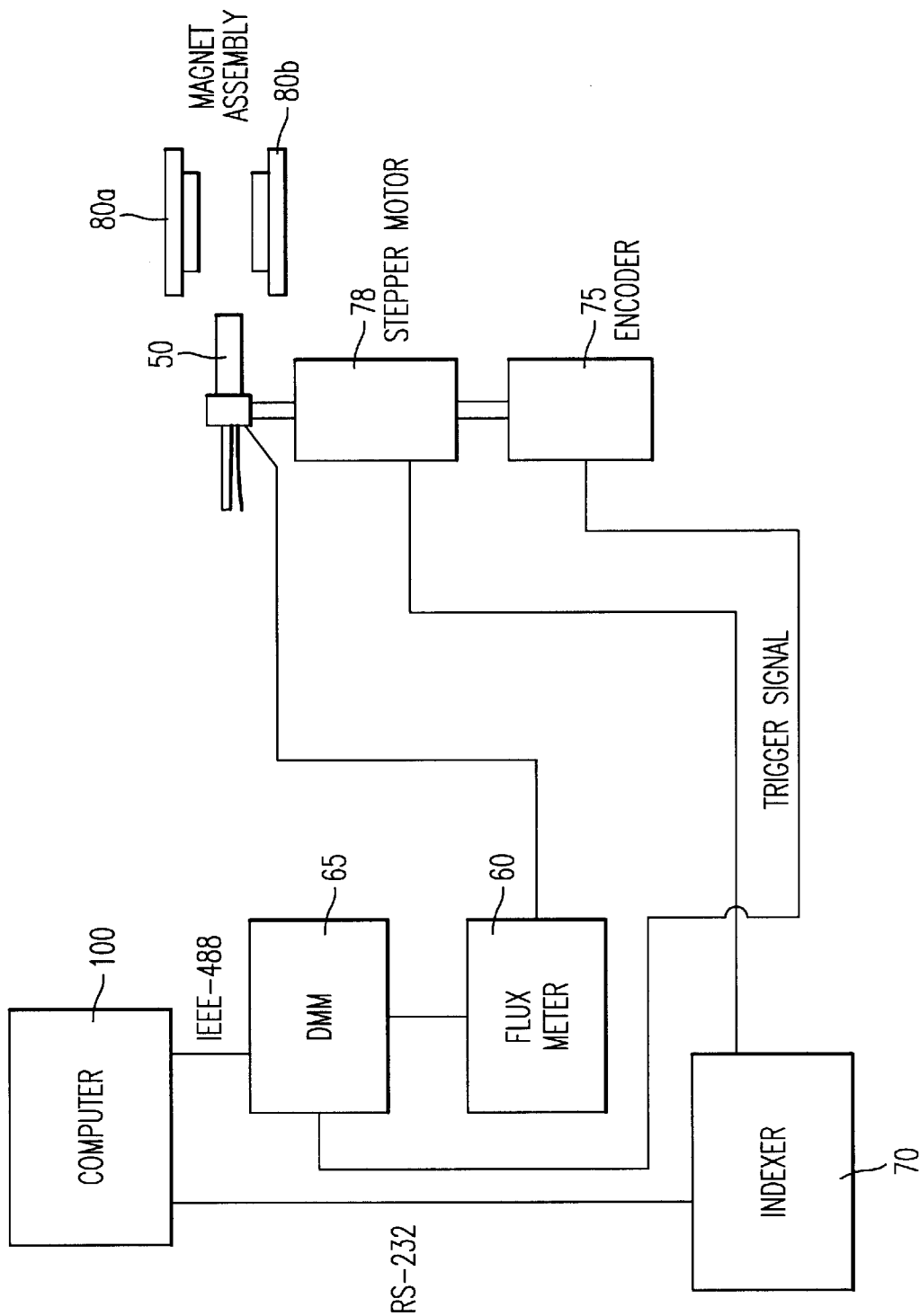
FIG. 2 is a schematic illustration of the system for performing the method according to the present invention.

Turning now to the drawings, in which like reference numerals designate identical or corresponding parts throughout the several views, FIG. 2 is a schematic illustration of a system for measuring the torque per unit current in the limit of zero current (i.e., the torque constant $K_t$) as a function of position or angle in actuators in hard disk drives. It is to be understood that the system of FIG. 2 is provided as an example, and various aspects of the present invention can also be advantageously utilized in other systems which utilize flux measuring devices. An actuator coil 50 to be analyzed is mounted on a mounting bracket attached to a stepper motor 78 to drive the actuator coil 50 through a range of motion corresponding to operating conditions inside a hard disk drive. In one embodiment, the movement is performed in a magnetic field created by a plate assembly 80A and 80B. In a second embodiment, either plate assembly 80A or plate assembly 80B is omitted. The present invention is useable in configurations where the polarizations are created by either (1) separate magnets or (2) a single magnet with two polarizations on the same magnet. For the first embodiment using two plate assemblies either four separate magnets 84 or two bi-polarized magnets 84 are utilized and attached to two separate mounting plates 82. For the second embodiment two separate magnets or one bi-polarized magnet are used and attached to a single mounting plate 82.

The movement of the stepper motor 78 is controlled by an indexer 70 and tracked by an encoder 75. In the embodiment shown in FIG. 2, a trigger signal is sent from the encoder 75 to a sampling control unit, such as a digital multimeter (DMM) 65. In an alternate embodiment, the output of the encoder is sent to the indexer 70 which generates the trigger signal and outputs the triggre signal to the DMM 65. The DMM 65 reads integrated voltage measurements from a fluxmeter 60 which is attached to the actuator coil 50. The data obtained from the DMM 65 is passed (e.g., transferred using an IEEE-488-, parallel- or serial-interface) to a computer 100. The computer 100 is also connected to the indexer 70.

For illustrative purposes only, the actuator coil 50 will be assumed to be in a magnetic field in an assembly. The magnet generating the field has remanent induction $B_r$=1.2T and has magnetic length 2.54 mm. Standard electromagnetic theory allows this to be modeled by an equivalent current of 2400 amperes on the edge of the magnet volume. The actuator coil 50 has number of turns=250 and a current of 0.3 ampere producing an equivalent total current of 75 amperes. With these parameters, the effective current of the actuator coil 50 would be 3% of the equivalent current on the edge of the magnet volume and would produce a change in the magnetization by 0.15%. In typical use, the actuator coil 50 has a range of −18 degrees to +18 degrees, and this range can be broken down into steps (i.e., inter-sample distances) of 0.2 degrees. This provides an array of over 200 values which are used to calculate $K_t(\theta)$.

Generally, the present invention utilizes a relationship describing force on a rigid current carrying conductor in a static externally applied field caused by at least one plate assembly 80A or 80B, or by both plate assemblies 80A and 80B. The rigid coil is the actuator coil, and the measured flux is the total flux through the coil due to the externally applied field. Background on such forces is given in Julius Stratton's *Electromagnelic Theory*, published by McGraw-Hill Book Company, New York, 1941, in the section entitled "2.14.

Magnetic Energy of Stationary Currents," the contents of which are incorporated herein by reference. Equation (7) in Stratton is defined as:

$$\delta W = \oint_{C_1} f \cdot \delta r = I \delta \Phi,$$

which relates 1) the work done on the rigid coil as the inner product of the total magnetic force due to the externally applied field and 2) the virtual displacement to the current in the coil multiplied by the change in flux due to the virtual displacement. Since $\delta W = F \cdot \delta r$, the force per unit current on the rigid coil is given by:

$$\frac{|F|}{I} = \frac{\delta \Phi}{\delta r}.$$

That is, the magnitude of the force per unit current in the direction of the displacement is the change in the flux due to the displacement. This is the general result for linear motion.

Figure 11:
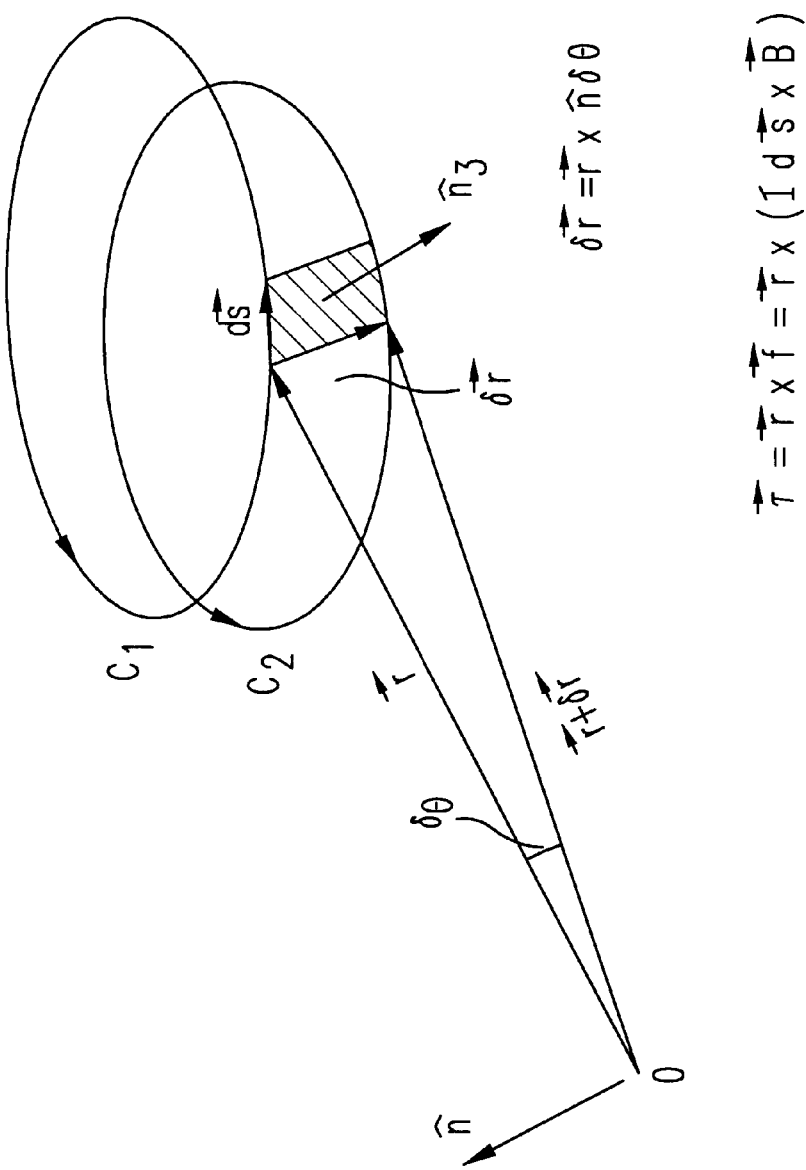
FIG. 11 is a schematic illustration showing the torque generated by a rotation of coils $C_1$ and $C_2$ about an axis $\hat{n}$.

The theory for the calculation of the force per unit current in the direction of angular displacement is described hereafter with relation to FIG. 11. In FIG. 11, conventional terminology is used which follows the terminology of Stratton. Two current contours (e.g., current carrying filaments) are defined as $C_1$ and $C_2$. A first corresponding surface $S_1$ is defined as a regular surface spanning the contour $C_1$. A second corresponding surface $S_2$ is defined to span $C_2$, but in such a way as to pass through $C_1$ and coincide with $S_1$. When the two contours are rotated $\delta\theta$ about an axis $\hat{n}$, $\delta \vec{r} = \vec{r} \times \vec{n} \delta\theta$. The torque is expressed by:

$$\vec{\tau} = \vec{r} \times \vec{f} = \vec{r} \times (I d\vec{s} \times \vec{B}).$$

Consequently, the work done by the torque $\vec{\tau}$ on the element $d\vec{s}$ for a rotation $\delta\theta$ about the axis $\hat{n}$ is given by:

$$\vec{\tau} \cdot \hat{n} \delta\theta = [\vec{r} \times (I d\vec{s} \times \vec{B})] \cdot \hat{n} \delta\theta$$
$$= (\vec{r} \times \hat{n}) \cdot (I d\vec{s} \times \vec{B}) \delta\theta$$
$$= \delta\vec{r} \cdot (I d\vec{s} \times \vec{B})$$
$$= I\vec{B} \cdot (\delta\vec{r} \times d\vec{s})$$

Therefore, the work performed by the torque integrated around the entire path $C_1$ is given by:

$$\delta W = \vec{N} \cdot \hat{n} \delta\theta = \left[ \oint_{C_1} \vec{\tau} \right] \cdot \hat{n} \delta\theta = I \delta \Phi, \text{ and}$$

$$\frac{\vec{N} \cdot \hat{n}}{I} = \frac{\delta \Phi}{\delta \theta}.$$

In order to calculate the angularly varying torque constant $K_t(\theta)$, it is possible to measure angularly varying flux, $\Phi(\theta)$. The torque constant $K_t$ is defined as the torque per unit current in the limit of zero current and is given by:

$$K_t = \frac{d}{d\theta} \Phi(\theta).$$

In hard disk drive actuators, $\Phi$ is a function of $\theta$, and $\theta$ is a function of time. Therefore, the time-varying flux in a coil causes a potential v(t) to appear across the terminals according to the equation:

$$v(t) = \frac{d\Phi}{dt} = -\frac{d\Phi}{d\theta}\frac{d\theta}{dt} = -\frac{d\Phi}{d\theta}\omega = -K_t \omega,$$

where $\omega$ is the angular velocity. From that equation, $K_t$ may therefore be rewritten as:

$$K_t = -\frac{v(t)}{\omega}.$$

However, it is impractical to determine $K_t$ this way since t, v(t), $\theta(t)$, and $\omega(t)$ must be determined and correlated according to this method. Instead, the equation for v(t) can be rewritten such that v(t) dt=−d$\Phi$. By integrating both sides with respect to time from $t_0$ to $t_1$, we get the equation:

$$\int_{t_0}^{t_1} v(t) dt = -\int_{\Phi_0}^{\Phi_1} d\Phi = -(\Phi_1 - \Phi_0).$$

Since $-(\Phi_1-\Phi_0)$ is independent of time and angular velocity, only the time integral of the induced potential v(t) needs to be measured at predetermined angles. This provides flux as a function of angle and can be measured by fluxmeters (i.e., integrating voltmeters).

Figure 3:
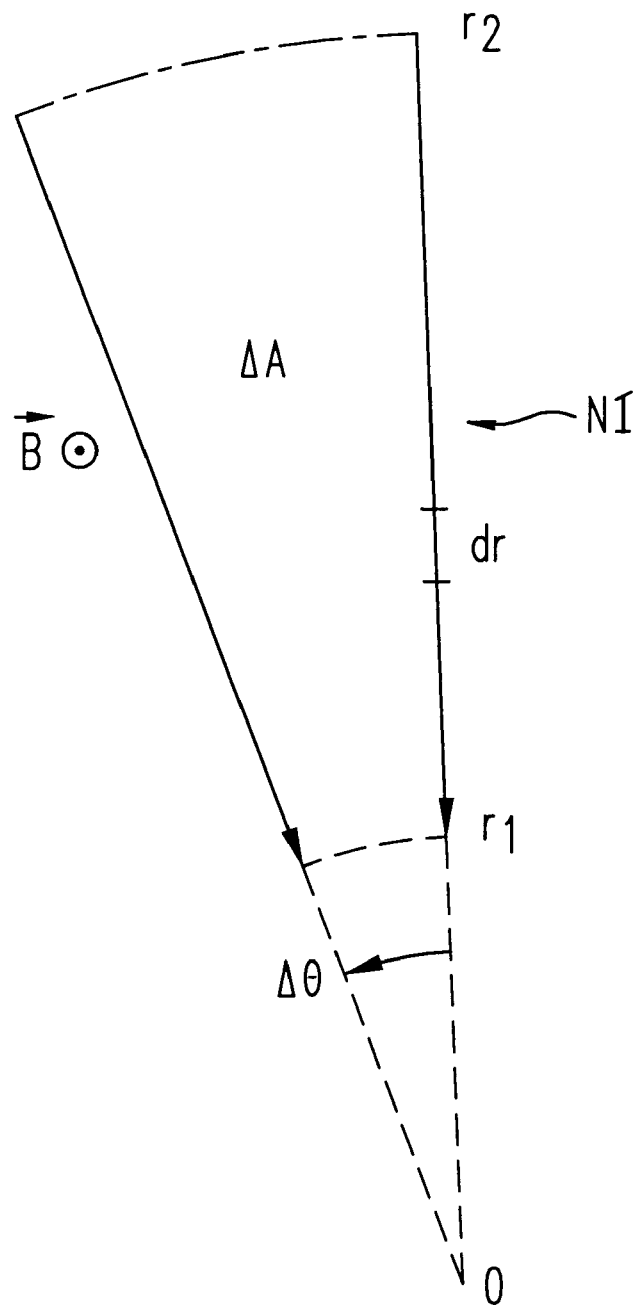
FIG. 3 is a schematic illustration of one branch of an actuator coil passing through a change in angle.

FIG. 3 is a simplistic view of how a first torque produced by one side branch of the actuator coil 50 moving within a magnetic field B. The total torque actually is given by the sum of the torque contributions of both side branches. In the other side branch, the directions of the field and the magnetic field are both reversed, producing a second torque of equal magnitude and direction to the first torque. As shown in FIG. 3, the actuator coil 50 is placed in a magnetic field B and rotated through a change in angle, $\Delta\theta$. The method and apparatus do not require that the magnetic field B be constant. As long as B does not vary with time but only position, the method and apparatus properly measure the flux relative to position. For simplicity, the remainder of the discussion assumes that B is constant. During angular movement, the area of a sweep is given by:

$$\Delta A = \frac{1}{2}(r_2^2 - r_1^2)\Delta\theta$$

This change in area produces a change in flux given by:

$$\Delta \Phi = BN \Delta A = \frac{1}{2} BN(r_2^2 - r_1^2)\Delta\theta$$

Therefore, the change in flux per change in angle is given by:

$$\frac{\Delta \Phi}{\Delta \theta} = \frac{1}{2} BN(r_2^2 - r_1^2)$$

As the actuator coil 50 moves angularly, a change in force given by: dF=NIB dr is produced, where N is a number of coils and I is the applied current. This produces a change in torque given by: dτ=r dF=NIBr dr. By integrating with respect to the length of the coil, torque is given by:

$$\tau = NIB \int_{r_1}^{r_2} r\, dr = I\left[\frac{1}{2} BN(r_2^2 - r_1^2)\right] = I \frac{\Delta \Phi}{\Delta \theta}$$

Consequently, the torque constant $K_t$ is given by:

$$K_t = \frac{\tau}{I} = \frac{\Delta \Phi}{\Delta \theta}$$

Figure 4:
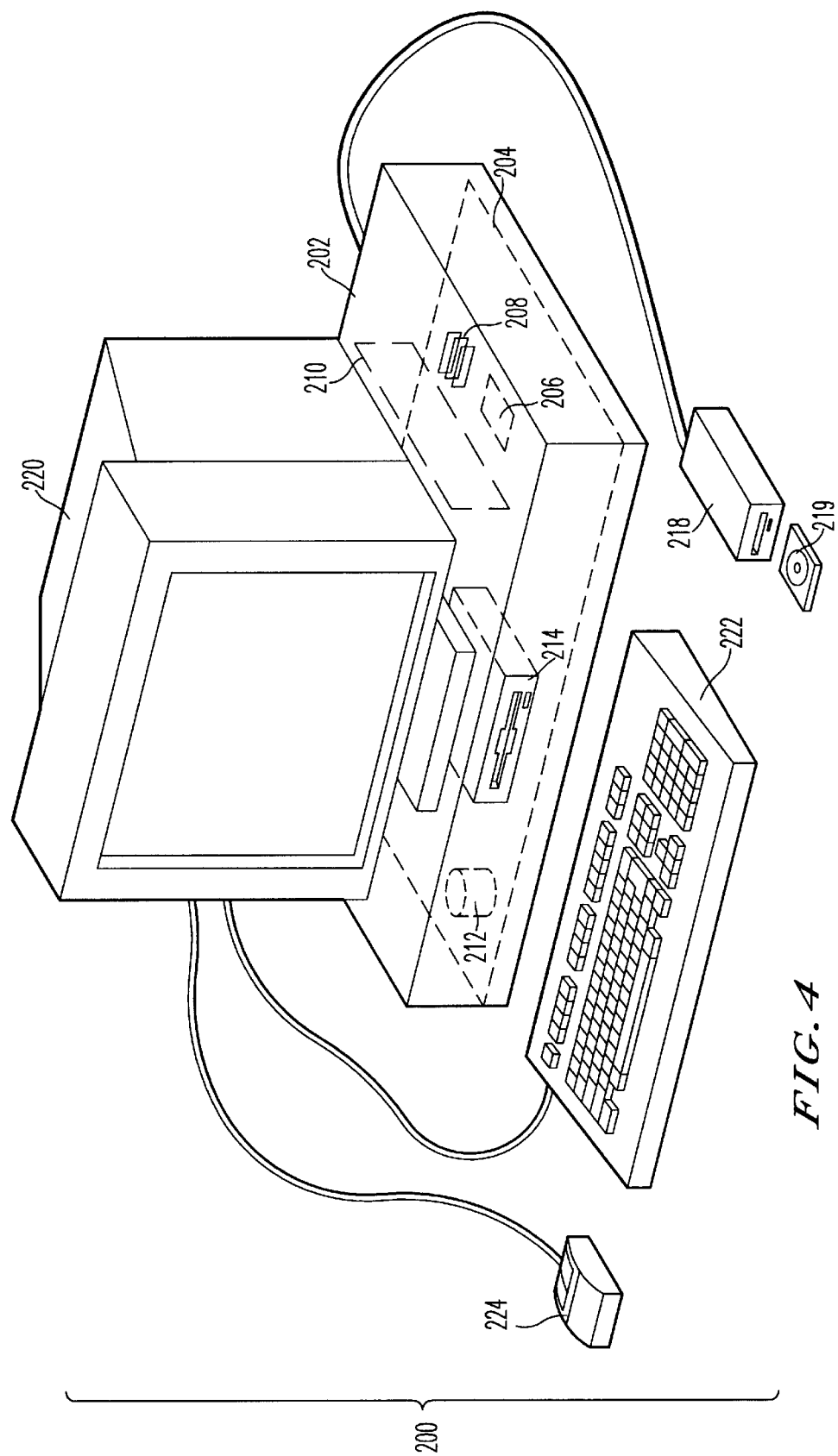
FIG. 4 is a more detailed schematic illustration of the computer system of FIG. 2 for controlling the other components of FIG. 2.

To calculate these relationships for an actuator coil 50, the present invention utilizes a computer system 100 illustrated in FIG. 4. The computer system 100 has a housing 102 which houses a motherboard 104 which contains a CPU 106, memory 108 (e.g., DRAM, ROM, EPROM, EEPROM, SRAM and Flash RAM), and other optional special purpose logic devices (e.g., ASICs) or configurable logic devices (e.g., GAL and reprogrammable FPGA). In addition, the computer system can have analog-to-digital (A/D) inputs 126 for receiving information from various analog detectors. The computer also has a communication port 128 for communicating with other computers. The computer 100 further includes plural input devices, (e.g., a keyboard 122 and mouse 124), and a display card 110 for controlling a monitor 120. In addition, the computer system 100 includes a floppy disk drive 114; other removable media devices (e.g., compact disc 119, tape, and removable magneto-optical media); and a hard disk 112, or other fixed, high density media drives, connected using an appropriate device bus (e.g., a SCSI bus or an Enhanced IDE bus). Although compact disc 119 is shown in a CD caddy, the compact disc 119 can be inserted directly into CD-ROM drives which do not require caddies. Also connected to the same device bus or another device bus as the high density media drives, the computer 100 may additionally include a compact disc reader 118, a compact disc reader/writer unit or a compact disc jukebox. In addition, a printer also provides printed copies of important information related to the process, including: raw flux measurements; corrected flux measurements; fitted, corrected flux measurements; and graphs of any of these measurements.

The computer system further includes at least one computer readable medium. Examples of such computer readable media are compact discs 119, hard disks 112, floppy disks, tape, magneto-optical disks, PROMs (EPROM, EEPROM, Flash EPROM), DRAM, SRAM, etc. Stored on any one or on a combination of the computer readable media, the present invention includes software for controlling both the hardware of the computer 100, the indexer 70, and the DMM 65; and for enabling the computer 100 to interact with a human user. Such software may include, but is not limited to, device drivers, operating systems and user applications, such as development tools. Such computer readable media further includes a computer program, according to the present invention, for measuring the angularly varying torque constant. A user interface such as LabWindows CVI 4.0 from National Instruments is adaptable to customer data, analysis, and storage requirements.

The computer 100 can serve as a remote computer, and can allow an operator to "log on" from a remote location and to initiate measurements or collect data from previous measurements. In an embodiment where testing is automatically performed (e.g., by automatically loading new actuator coils to test with a known plate assembly, or by automatically loading new plate assemblies to test with known actuator coils), a log of test results are kept for each new component tested. In another embodiment, the computer 100 provides data to remote computers without having a user "log on." In this embodiment, the computer 100 provides responses to queries using a stateless query mechanism, such as the Hypertext Transfer Protocol (HTTP) queries. In this embodiment, the responses are in the form of Hypertext Markup Language (HTML) documents, and may include text, graphics or a combination of text and graphics.

Figure 5A:
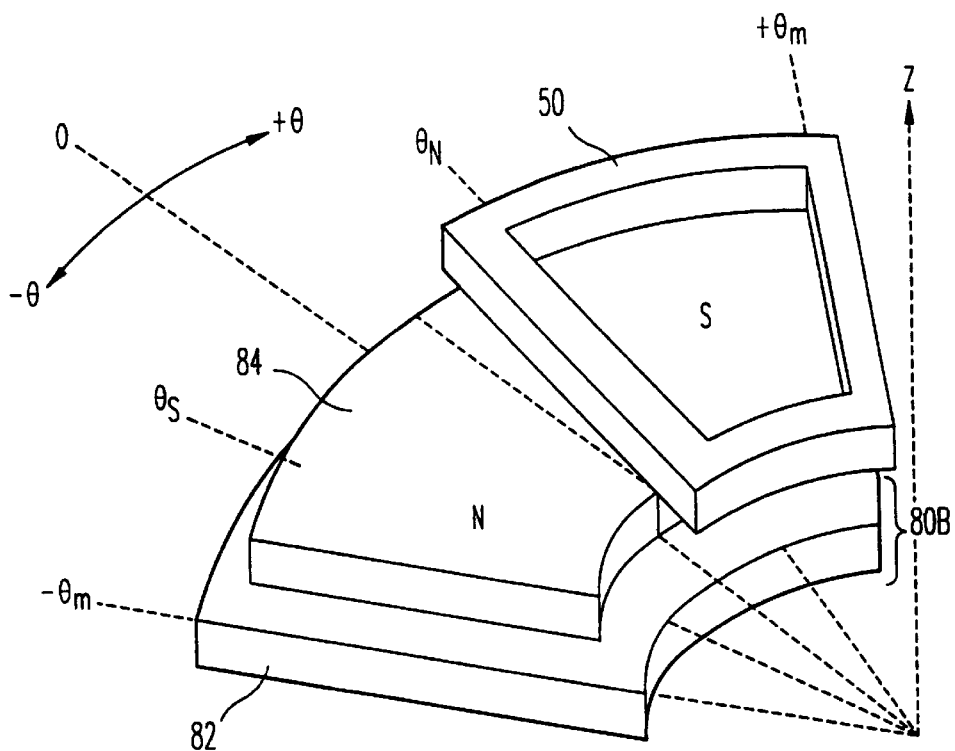
FIG. 5A is a schematic illustration of an actuator at a maximum rotation position during testing according to the present invention.
Figure 5B:
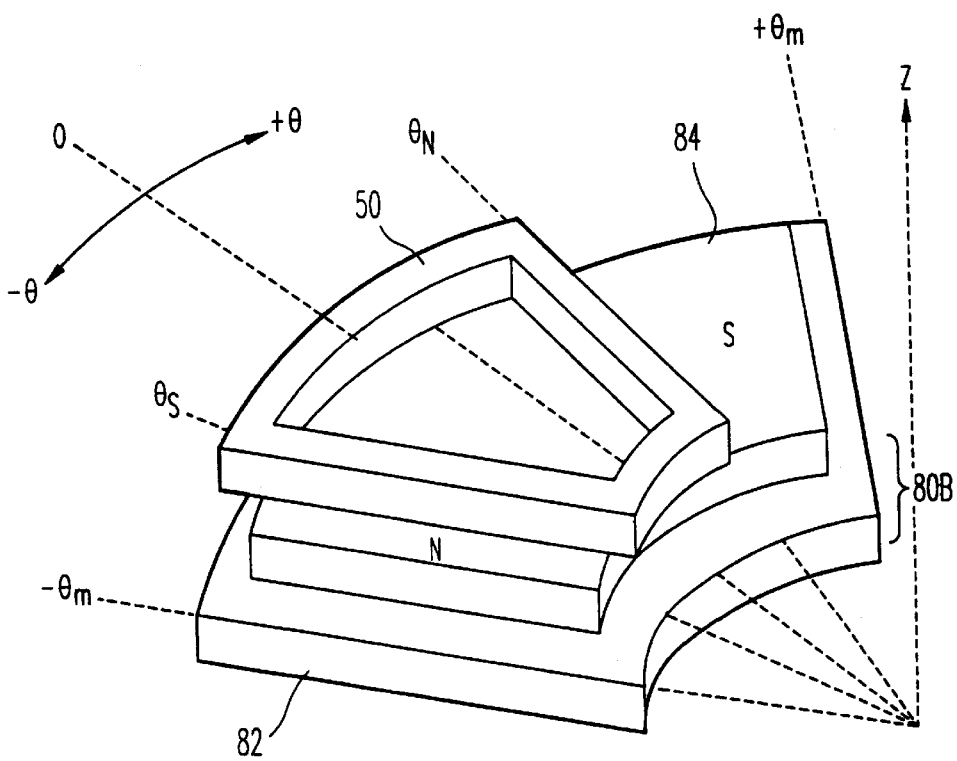
FIG. 5B is a schematic illustration of the actuator at a minimum rotation position during testing according to the present invention.

To use the above relationships to determine the torque constant, the present invention uses a multi-step process: (1) connect a measuring device (i.e., fluxmeter 60) to the actuator coil 50 and move the magnet assembly 80A and 80B over the coil, (2) check drift rate and adjust if required, (3) check offset and zero if too large, (4) move coil to a position so that the plate assemblies 80A and 80B can be moved into place, (5) move the plate assemblies 80A and 80B into place, (6) rotate the coil to the minimum angle as shown in FIG. 5A, (7) arm the measuring device control unit (e.g., digital multi-meter 65) (8) rotate the coil to the maximum angle, as shown in FIG. 5B, while the programmed pulses from the indexer 70 trigger the measuring device control unit to read from the fluxmeter 60, (9) rotate the coil to the minimum angle while the programmed pulses from the indexer 70 trigger the measuring device control unit to read from the fluxmeter 60, and (10) move the coil to a position to allow removal of the plate assemblies 80A and 80B. If less precise measurements (i.e, measurements with more drift) are acceptable, the measuring step (9) can be omitted.

In order to provide accurate measurements, drift measurements must be removed from the flux measurements. Temperature-dependent, constant voltages are always present in circuits due to potentials generated at junctions of dissimilar metals. However, any change temperature dependent change causes a disturbing constant voltage change since the induced voltage being measured is very small—typically on the order of microvolts. Existing commercial fluxmeters have an adjustment to compensate for drift, but this adjustment is too coarse for accurate positioning. In practice, signals causing drift are constant over typical measurement intervals. These constant input signals result in changes in the measured flux that are linear in time with a slope determined by the input signal.

Figure 6A:
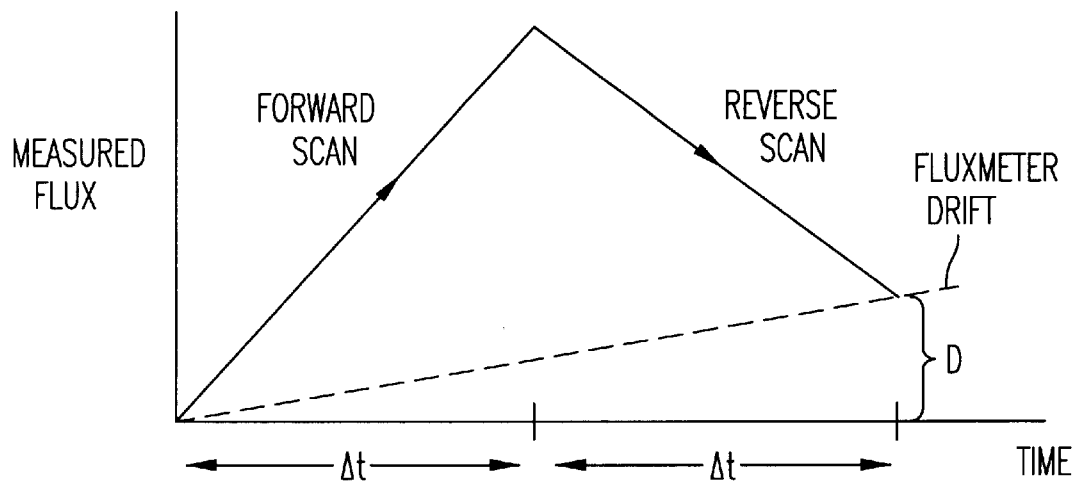
FIG. 6A is a graph of measured flux (including drift) versus time for a forward and a reverse sweep which are from a minimum to a maximum angle and from a maximum to a minimum angle, respectively.
Figure 6B:
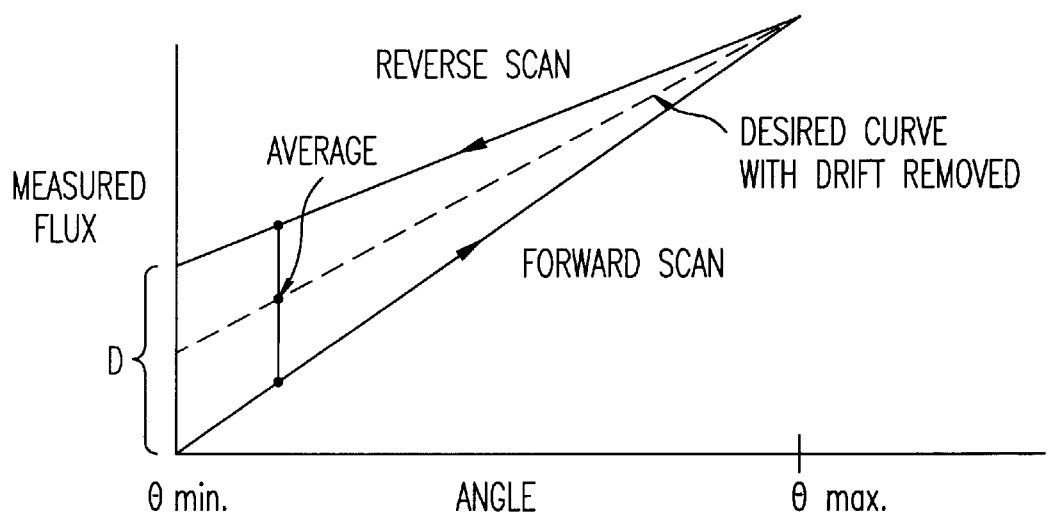
FIG. 6B is a graph of measured flux (including drift) versus angle obtained by superimposing the measured flux for the forward sweep with the measured flux for the reverse sweep, as well as an interpolated calculated flux with the drift averaged out.

The data collected in steps (8) and (9) are used to calculate $\Phi(\theta)$ point-by-point and to calculate the derivative with respect to the rotational angle, $\theta$, such that $K_t = d\Phi/d\theta$. In a preferred embodiment, the step of calculating $\Phi(\theta)$ point-by-point further includes a method for correcting for drift in the fluxmeter 60. The measurement of the present invention records extra data to calculate and remove the drift. All that is required is that the drift rate be adjusted to be small to minimize the very small errors from the assumption of constant drift rate. To do this, the drift rate is adjusted by compensating for constant potential on the terminals of the fluxmeter. An operator observes the rate of change of the reading with time and adjusts the fluxmeter to minimize this rate. In steps (8) and (9), the computer 100 records pairs of values, i.e., (1) the angle of that actuator coil 50 as measured by the encoder 75 and (2) the flux measurement at that angle. FIG. 6A is a graph showing the measurements taken in step (8) (i.e., in the forward scan) and in step (9) (i.e., in the reverse scan). Although the measurements are shown with reference to time, the time is convertible to angle, with the midpoint of the time axis corresponding to the maximum angle, $\theta_{max}$. The data from step (8) and the data from step (9) are stored separately. To correlate the data from step (9) with the data from step (8), the data from step (9) is reversed, creating two flux measurements per stored angle. FIG. 6B is a graph of the correlated data after reversal. It should be noted that another reason that this technique works is that any constant offset in the measured flux is removed when taking the derivative of the flux with respect to the rotational angle of the actuator.

A series of corrected average values between the forward and reverse scans are calculated according to the equation:

corrected(θ)=(forward(θ)+reverse(θ))2, and shown by the dashed line in FIG. 6B. From the averaged values, the drift signal can be determined by taking the difference point-by-point between the average and the two scans, i.e., the forward and reverse passes of steps (8) and (9), respectively. The averaged data is nearly linear for a typical actuator assembly, and the slope is either positive or negative depending on coil connections, magnet polarity, and the definition of angle direction. To correlate two sets of average data measurements for two different actuator coils or plate assemblies, the average of all averaged points is subtracted from each averaged point. This creates averaged values which are comparable since the constant potential of the set of measurements is removed.

In order to determine $K_t$, the derivative of the data with respect to the angle measured in radians is determined. If first differences of the data are calculated, the torque constant is subject to measurement noise. Using interpolation functions gives the same result. Instead, the present invention takes more data samples than required to model the magnetic field and fits the data to an interpolating polynomial of sufficiently high order that all real structure is present. Another factor in producing a good fit is to fit to polynomials that are orthogonal over the angle range of test. This results in fit parameters that decrease rapidly as the order of the polynomial is increased. This works because the main feature of the data is the linear term which allows the torque to be constant over the angle range. When using additional parameters no longer reduces the fit error, the real features have been captured and the remaining error is attributable to noise.

Figure 7:
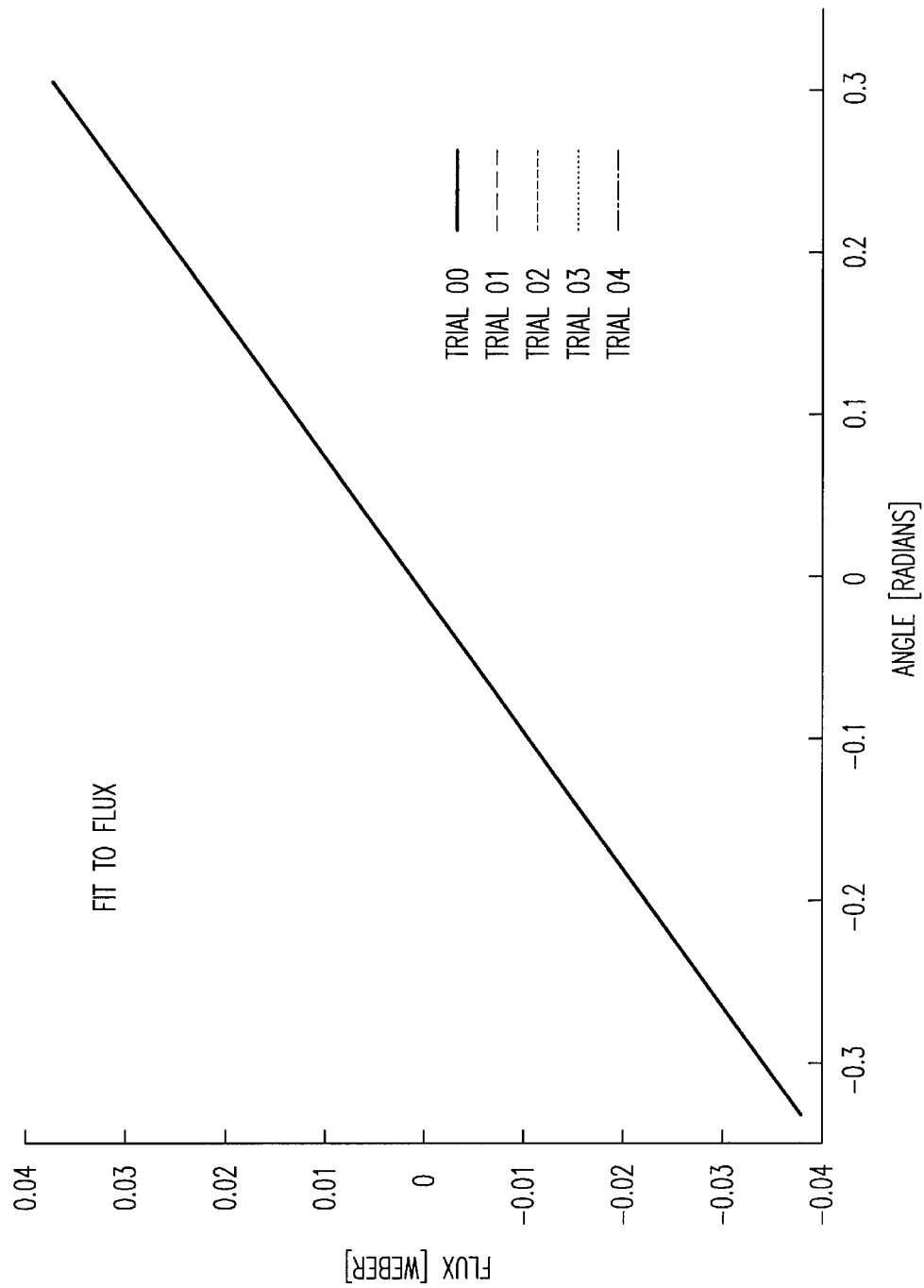
FIG. 7 is a graph of flux versus angle for an angle range between −0.3 and 0.3 radians for five trials where the flux has been approximated by a high order function.

Having determined a fit polynomial, the derivative of the fit polynomial is then taken. This procedure smooths the data, retaining all the physical information but removing the noise. Such a procedure is described in "Interpolation of Hall probe calibration data," Light Source Note LS-207, by D. W. Carnegie, in cooperation with the Argonne National Laboratory, Argonne, Ill. Jul. 23, 1992, incorporated herein by reference. FIG. 7 is a graph of fit data versus flux. By examining a graph of the residuals of the fit, a visual indication of the quality of the fit is obtained. Numerically the fit can be determined by calculating the sum of the squares of the errors of the fit. For higher order fit polynomials, the sum of the squares of the errors decreases. Experimental testing shows that a polynomial of order 11 to 15 is adequate. A least squares fit is often ill-conditioned and sensitive to round off during computation. Instead, a numerically stable fit algorithm is used to perform this fit, for example using a singular value decomposition algorithm. The torque constant $K_t$ is then computed directly using the fit coefficients in the derivative of the fit polynomial. If the flux is measured in volt-seconds and the angle is in radians, the torque constant (i.e., the torque per unit current in the limit of zero current) is in units of newton-meter/ampere.

Figure 8:
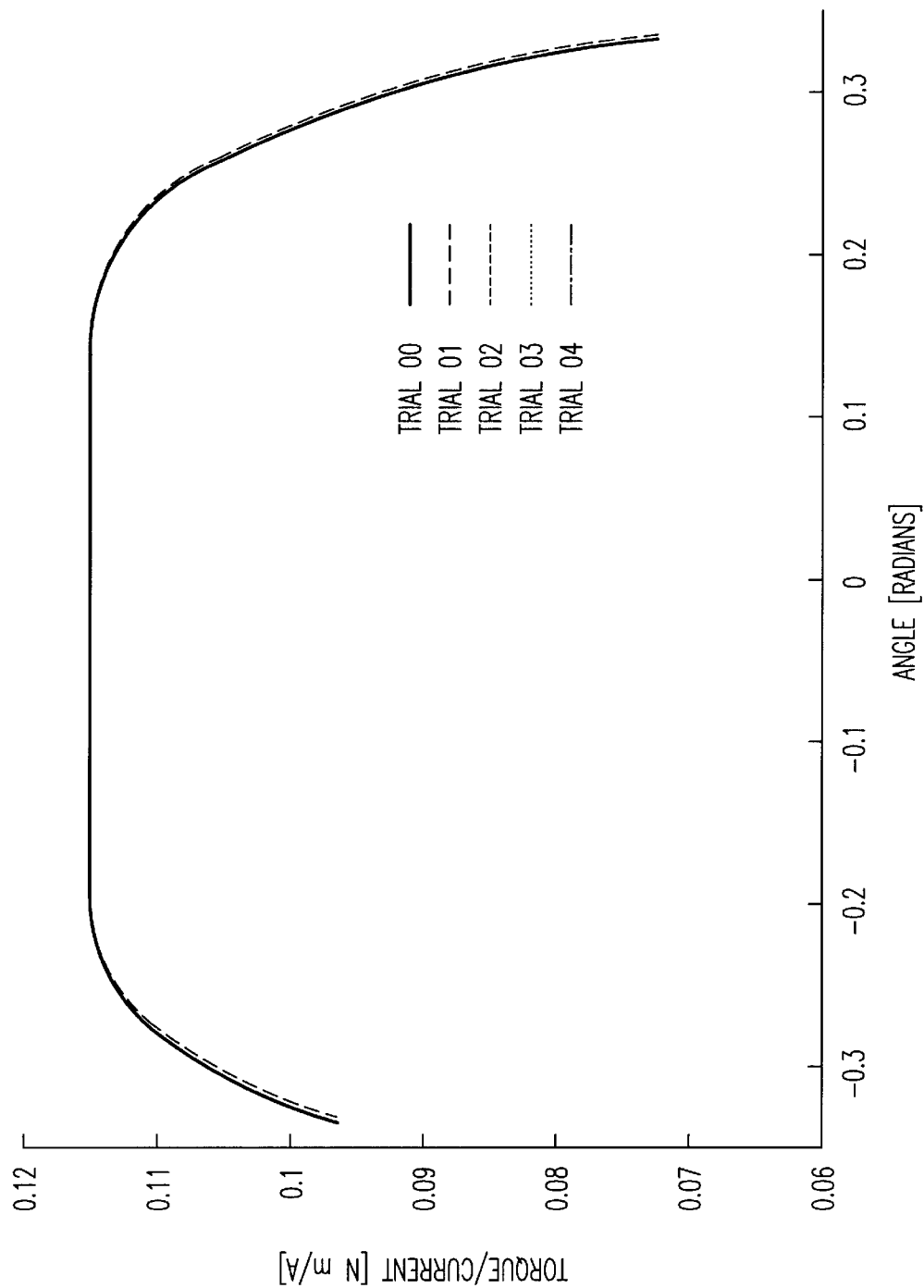
FIG. 8 is a graph of torque/current versus angle for the five trials shown in FIG. 7.

FIG. 8 is a graph of torque/current versus angle using the fit polynomial. Together, FIGS. 7 and 8 show that the method of the present invention is very reproducible.

To make this procedure traceable to NIST standards, two primary instruments are used with calibration traceable to NIST standards. The first is an HP-3458A digital multimeter. The second is an HP-53132A universal counter. Thus, both the volt and the second are traceable. These instruments are used to calibrate volt-second generators which are in turn used to calibrate fluxmeters in the plant. Calibration is done by external companies as would be appreciated by one of ordinary skill in the art.

Figure 9:
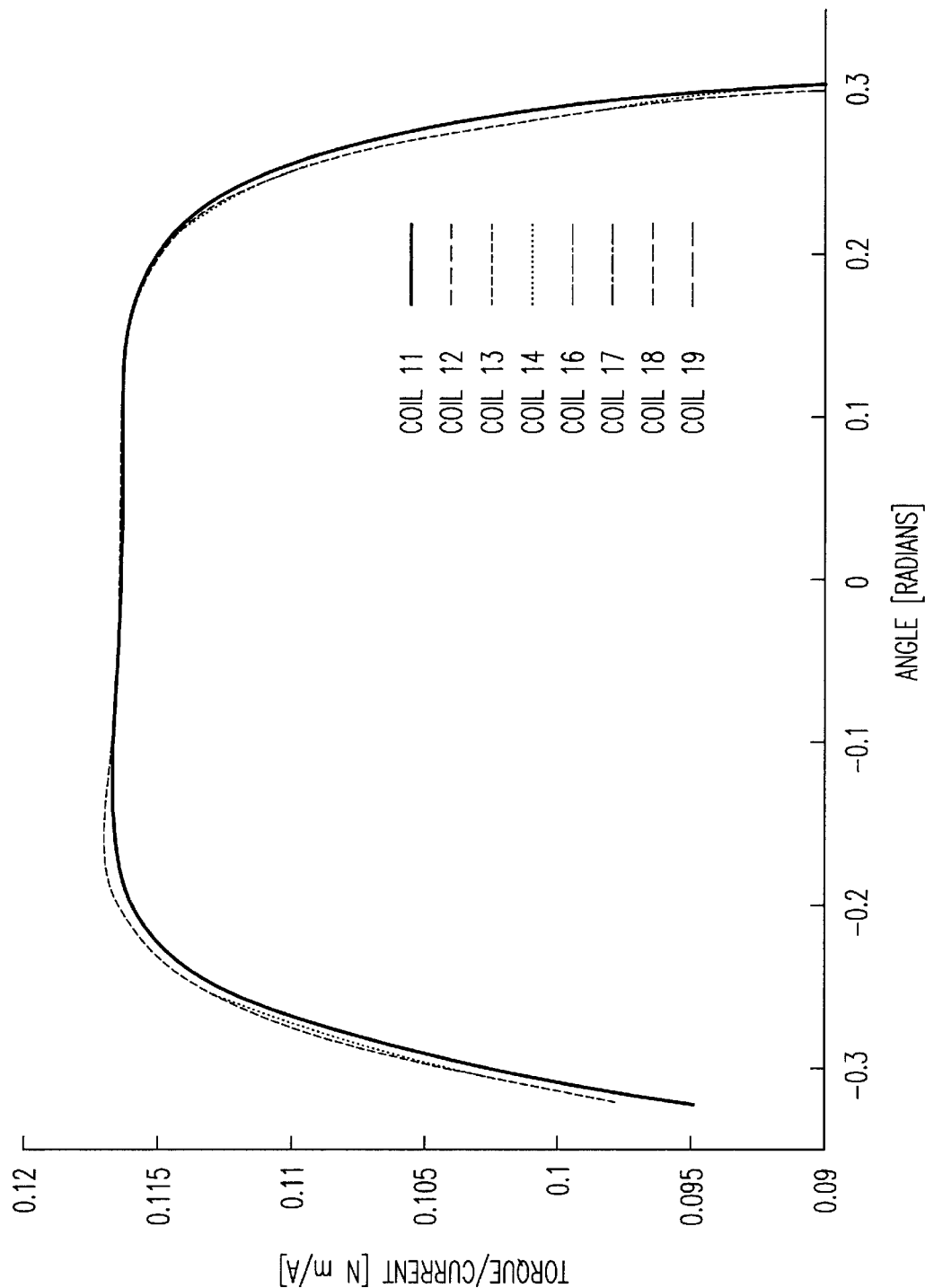
FIG. 9 is a graph of torque/current versus angle for eight different coils.
Figure 10:
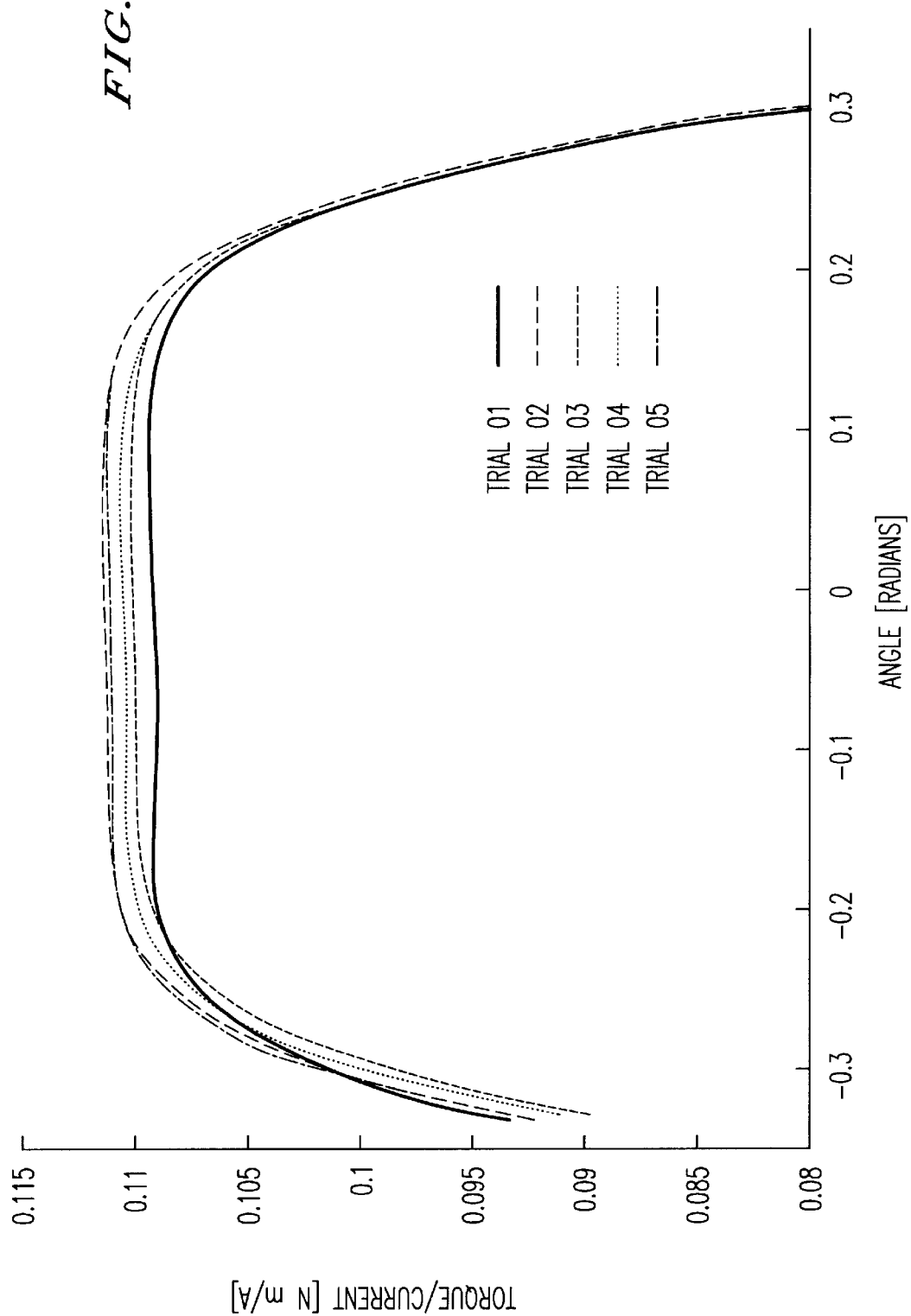
FIG. 10 is a graph of a using torque/current versus angle for a single coil passing through five different plate assemblies.

The remaining source of variation is the coil itself. When repeatedly using the same coil, the results are reproducible and traceable. Coil variations in a design can often allow ±3 turns in a coil of 260 turns. This causes a ±1% variation from coil to coil when measuring the same magnet assembly. FIG. 9 is a graph comparing eight different coils which are swept through an angular range of −0.3 radians to 0.3 radians. Although changing actuator coils can introduce error into the testing of plate assemblies, plate assemblies can be accurately measured by consistently using a single coil or a few representative coils. Finally, FIG. 10 shows the results of five tests using the same actuator but different plate assemblies. FIG. 10 shows that flux versus angular for different plate assemblies varies widely and that proper classification through individual testing will provide more accurate positioning.

Figure 12:
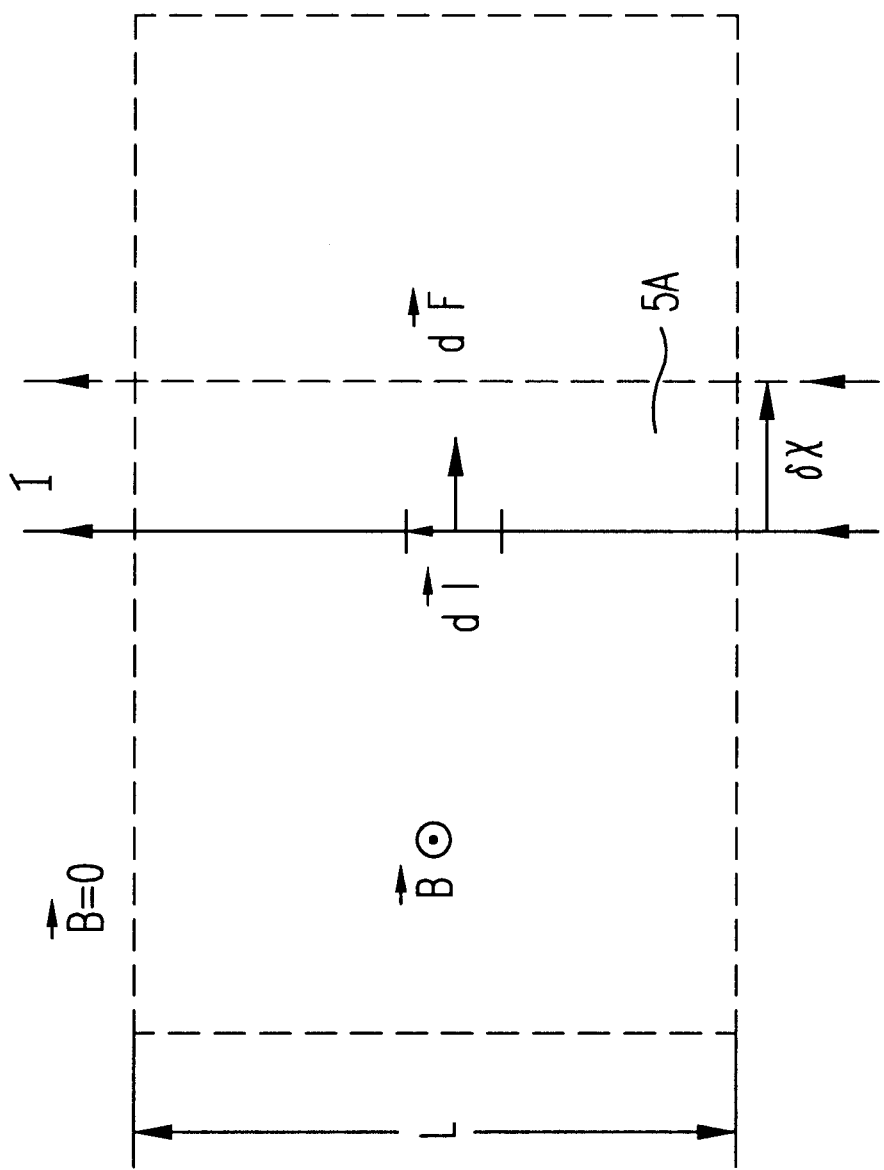
FIG. 12 is schematic illustration of one branch of an actuator coil passing through a change in linear position.

Just as the present invention can analyze rotary actuators, so too can it analyze linear actuators. Similar to the movement of a rotary actuator shown in FIG. 3, FIG. 12 shows the movement of a linear actuator through a magnetic field, B. Although the magnetic field is shown as a uniform field projecting out of the page inside the dashed lines, the magnetic field may also be position-dependent. FIG. 12 further illustrates an idealized zero magnetic field outside the dashed lines. Based on a movement of δx, the resulting force can be calculated using the relations:

$$d\vec{F} = I\, d\vec{l} \times \vec{B}$$

dF=IBdl

F=IBL

Using the force equation, an amount of work due to the displacement δx is calculated according to:

$$\vec{F} \cdot \vec{\delta x} = F\, \delta x = IBL\, \delta x = I[B\, \delta A] = I\delta\Phi.$$

Accordingly, the force per unit current in the direction of the displacement is the change in the flux due to the linear displacement as given by:

$$\frac{F}{I} = \frac{\delta\Phi}{\delta x}.$$

To move the linear actuator through a magnetic field, either the coil is linearly driven through a fixed magnetic field, or a magnetic assembly is driven above, below, or around a fixed coil. The motion is achieved through the use of a motorized linear stage or the like whose position is tracked by an indexer and a linear encoder, similar to FIG. 2. The linear encoder provides both position data and trigger signals to the system as described above. The resulting sampled data is flux as a ftinction of position. By calculating the derivative of the flux data with respect to the displacement, the system obtains the force constant, i.e., the force per unit current in the direction of the displacement.

The method and apparatus of the present invention are directly related to automating the testing of plate assemblies 80a and 80B and actuator coils 50. In an automated tester, the metal mounting plates 82 include alignment pins for aligning a magnet 84 on the mounting plate 82. The magnet 82 is placed over the pins either by an operator or automatically. The plate assembly 80A then is moved into position for testing, either manually or automatically after sensing the presence of the magnet 84. When the operator or the automatic control system senses that the plate assembly 80A and the actuator coil 50 are properly positioned, either visually or using sensors (e.g., trip switches), respectively, the flux measurements are taken automatically under computer control. After testing, the magnet 84 is separated from the mounting plate 82, either manually or automatically. The actuator coils or magnets 82 are then conveyed to a holding/shipping area for transport. The data concerning the coils or magnets may either be conveyed with the corresponding part or conveyed separately. The conveyance also may be automated with either mechanical belts or air conveyance systems. The system likewise can adjust the height or location of the magnets or actuator coils on a multi-purpose testing device to simulate any one of several usage configurations.

As a result of using the coil of an actuator under test to sense an induced voltage (rather than generating a magnetic field and moving an actuator arm as in known systems), the present invention has many advantages over known systems. A complete measurement of $K_t(\theta)$ over the whole range (e.g., 200 measurements in 0.2 degree increments) is very fast, taking only two seconds. In fact, the faster the measurement is taken, the more accurate the result. Also, the measurements for $K_t(\theta)$ are repeatable at each given $\theta$ with an accuracy of 0.1%, as compared to 2–3% for known systems. Further, the measurements are traceable to NIST standards by relying on the calibration of two electronic instruments which themselves can be calibrated to traceable standards. Further, the alignment of the system of the present invention is correct to 0.1 degrees, a substantial improvement over known systems which have errors in the range of 1% to 2%. Also, no current is applied to the system which would require a further calibration. The torque measurements are likewise (1) independent of the effects and influences of all external forces (e.g., pivot friction and lead tension), and (2) independent of vibrations in the testing environment which would adversely affect force transducers. The setup procedure ensures that reliable angle values can be used to measure such characteristics as roll-off at defined angles, the effects of magnet displacement, transition zone misplacement, and the effects of design changes in steel plates and the magnet outline.

Obviously, numerous modifications would be evident to one of ordinary skill in the art in light of the teachings of the present application. The scope of protection for the present application is limited only by the scope of the attached claims.

What is new and desired to be protected by Letters Patent of the United States:

1. A method of determining a torque constant, $K_t$, of an actuator, the method comprising the steps of:
   passing the actuator through a magnetic field;
   measuring a flux as the actuator passes through the magnetic field;
   determining the torque constant, $K_t$, of the actuator as a change in the flux with respect to a change in position.

2. The method as claimed in claim 1, wherein the step of passing the actuator through a magnetic field comprises the step of passing the actuator through the magnetic field angularly, and
   wherein the step of determining comprises the step of determining the change in flux with respect to a change in angle.

3. The method as claimed in claim 1, wherein the step of passing the actuator through a magnetic field comprises the step of passing the actuator through the magnetic field linearly, and
   wherein the step of determining comprises the step of determining the change in flux with respect to a change in linear position.

4. The method as claimed in claim 1, wherein the step of measuring a flux comprises the steps of attaching the actuator to a flux meter and measuring the flux with the fluxmeter.

5. The method as claimed in claim 1, wherein the step of passing the actuator comprises the step of passing the actuator angularly forward and backward through the magnetic field.

6. The method as claimed in claim 1, wherein the step of determining comprises the steps of fitting the flux measured in the measuring step to a fit polynomial, and calculating a derivative of the fit polynomial with respect to the change in angle.

7. The method as claimed in claim 1, wherein the step of passing comprises the step of attaching the actuator to a stepper motor,
   wherein the step of measuring the flux comprises the steps of attaching the stepper motor to an encoder, and measuring an angle of the actuator using the encoder substantially each time the flux is measured.

8. The method as claimed in claim 1, wherein the step of passing the actuator through a magnetic field comprises the step of passing the actuator through a magnetic field generated by a magnetic assembly.

9. The method as claimed in claim 1, further comprising the steps of:
   setting an angle reference; and
   aligning a height and pivot location of the actuator relative to a magnet assembly.

10. The method as claimed in claim 1, wherein the step of measuring comprises the step of using an NIST standard to calibrate a device for measuring flux.

11. The method as claimed in claim 5, wherein the step of measuring comprises the steps of:
    determining a difference between the flux for a forward direction and a flux for a reverse direction.

12. A system for determining a torque constant, $K_t$, of an actuator, comprising:
    a driver for passing the actuator through a magnetic field;
    a fluxmeter for measuring a flux as the actuator passes through the magnetic field; and
    a determining means for determining the torque constant, $K_t$, of the actuator as a change in the flux with respect to a change in position.

13. The system as claimed in claim 12, wherein the driver comprises a stepper motor for passing the actuator through the magnetic field angularly, and
    wherein the determining means comprises means for determining the change in flux with respect to a change in angle.

14. The system as claimed in claim 12, wherein the driver comprises a motorized linear stage for passing the actuator through the magnetic field linearly, and
    wherein the determining means comprises means for determining the change in flux with respect to a change in linear position.

15. The system as claimed in claim 12, wherein the driver comprises a stepper motor for passing the actuator angularly forward and backward through the magnetic field.

16. The system as claimed in claim 12, wherein the means for determining comprises means for fitting the flux measured by the fluxmeter to a fit polynomial, and for calculating a derivative of the fit polynomial with respect to the change in angle.

17. The system as claimed in claim 12, further comprising at least one magnetic plate assembly.

18. The system as claimed in claim 12, further comprising:

an angle setting means for setting an angle reference; and an aligning device for aligning a height and pivot location of the actuator relative to a magnet assembly.

19. The system as claimed in claim 12, wherein the fluxmeter is an NIST calibrated fluxmeter.

20. The system as claimed in claim 12, wherein the means for determining comprises means for determining a difference between a flux for a forward direction and a flux for a reverse direction.

* * * * *